(12) United States Patent
Ishida

(10) Patent No.: US 10,275,199 B2
(45) Date of Patent: Apr. 30, 2019

(54) COMMUNICATION DEVICE, MANAGEMENT SERVER, COMMUNICATION SYSTEM, AND PROGRAM

(71) Applicant: SEIKO EPSON CORPORATION, Tokyo (JP)

(72) Inventor: Go Ishida, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/943,973

(22) Filed: Apr. 3, 2018

(65) Prior Publication Data

US 2018/0314482 A1     Nov. 1, 2018

(30) Foreign Application Priority Data

Apr. 26, 2017   (JP) .................................. 2017-086968

(51) Int. Cl.
| | |
|---|---|
| *G06F 3/12* | (2006.01) |
| *G06Q 30/06* | (2012.01) |
| *G06K 15/00* | (2006.01) |
| *H04L 29/08* | (2006.01) |
| *H04L 29/06* | (2006.01) |

(52) U.S. Cl.
CPC .......... *G06F 3/1288* (2013.01); *G06F 3/1222* (2013.01); *G06F 3/1238* (2013.01); *G06F 3/1285* (2013.01); *G06F 3/1293* (2013.01); *G06K 15/407* (2013.01); *G06Q 30/0601* (2013.01); *H04L 63/0876* (2013.01); *H04L 67/125* (2013.01)

(58) Field of Classification Search
CPC . G06F 3/1288; G06F 3/1238; H04L 63/0876; H04L 67/125

USPC ....................................................... 358/1.15
See application file for complete search history.

(56) References Cited

U.S. PATENT DOCUMENTS

| | | | |
|---|---|---|---|
| 2008/0030769 A1* | 2/2008 | Hanaoka ............ | G03G 15/5075 358/1.15 |
| 2009/0009797 A1* | 1/2009 | Nimura ................ | B41J 2/17566 358/1.15 |
| 2016/0288515 A1 | 10/2016 | Matsuda | |

FOREIGN PATENT DOCUMENTS

| | | |
|---|---|---|
| EP | 1351470 A2 | 10/2003 |
| EP | 1976238 A2 | 10/2008 |
| JP | 2016-194771 A | 11/2016 |

OTHER PUBLICATIONS

The Extended European Search Report for the corresponding European Patent Application No. 18169105.6 dated Aug. 23, 2018.

* cited by examiner

*Primary Examiner* — Neil R McLean

(57) ABSTRACT

Provided is technology enabling uploading device management information more appropriately. A communication device that manages a device, including: a storage device configured to store management information related to the device; a communicator configured to execute communication with an external device through a network; and a controller configured to cause the communicator to send the management information to a server specified by address information as the transmission destination when the communicator receives from a management server address information specifying a server to manage the device. The controller causes the communicator to send device identification information to the management server; and the communicator receives the address information corresponding to (Continued)

the identification information from the management server as a response to transmission of the identification information.

12 Claims, 4 Drawing Sheets

40

| IDENTIFICATION INFORMATION | UPLOAD APPROVAL INFORMATION | DESTINATION ADDRESS INFORMATION |
|---|---|---|
| **** | ALLOWED | http://www.exam····· |
| **** | ALLOWED | **** |
| **** | ALLOWED | **** |
| **** | NOT ALLOWED | **** |
| ⋮ | ⋮ | ⋮ |

FIG. 2

COMMUNICATION DEVICE, MANAGEMENT SERVER, COMMUNICATION SYSTEM, AND PROGRAM

BACKGROUND

1. Technical Field

The present invention relates to a communication device, a management server, a communication system, and a program.

2. Related Art

Printer information such as the amount of ink remaining is uploaded to a specific server and used for printer management.

Data management servers configured to acquire remaining quantity information related to the amount of ink remaining in a printer, and order replacement cartridges when the remaining amount of ink is less than or equal to a threshold, and the remaining quantity information is remaining cartridge level information associated with an order command, are also known from the literature. See, for example, JP-A-2016-194771.

However, instead of sending information related to devices such as printers to a predetermined server for management, a configuration that sends the information to an appropriate server for management is desired.

The present invention is directed to the foregoing problem, and provides a communication device, a management server, a management system, and a program that contribute to realizing the appropriate transmission and management of information related to devices.

SUMMARY

One aspect of the invention is a communication device that manages a device, including: a storage device configured to store management information related to the device; a communicator configured to execute communication with an external device through a network; and a controller configured to cause the communicator to send the management information to a server specified by address information as the transmission destination when the communicator receives from a management server address information specifying a server to manage the device.

Thus comprised, the communication device can send management information to the appropriate server according to address information received from the management server.

The invention may also be a configuration enabling the device itself to function as a communication device that communicates with a server. In other words, the communication device may include the device. Alternatively, the invention may be embodied by a configuration in which a device (communication device) that acquires and stores management information from a device communicates with a server. In other words, the communication device may acquire the management information from an external device, and store the acquired management information in the storage device. Alternatively, the communication device of the invention may be a configuration including a device and a separate other device.

In another aspect of the invention, the controller causes the communicator to send identification information of the device to the management server; and the communicator receives the address information corresponding to the identification information from the management server as a response to transmission of the identification information.

Thus comprised, the communication device, by sending identification information of the device to a management server, can acquire from the management server address information indicating the destination to which to send the management information of the device.

In another aspect of the invention, the controller stores the address information the communicator received in a second storage device, and determines the destination of the management information based on the address information the second storage device stores.

Thus comprised, the communication device, after receiving and storing address information from a management server in a second storage device, can determine the destination of the management information by referencing the address information stored in the second storage device.

In another aspect of the invention, when the communicator receives a command to change the destination of the management information from a server specified by the address information, the controller causes the communicator to send identification information of the device to the management server; and when the communicator receives new address information corresponding to the identification information from the management server as a response to transmission of the identification information, the controller causes the communicator to send the management information to the server specified by the new address information as the destination.

Thus comprised, by sending device identification information to the management server when the change command is received from the server that until then was the destination for management information, the communication device can acquire from the management server address information identifying a new destination for the management information. As a result, the communication device can respond appropriately to changes in the destination of the management information.

The technical concept of the invention may also be embodied by forms other than a communication device. For example, the invention may also be conceived of as a management server including: a storage device configured to relationally store identification information of a device, and address information specifying a destination server to which management information related to a device is sent; a communicator configured to execute communication through a network with an external communication device that manages a device; and a controller configured to cause the communicator to send the address information corresponding to the identification information of the device the communication device manages to the communication device as the destination with which the communicator communicates.

One feature of the management server can also be conceived of as a configuration in which the storage device additionally stores upload approval information specifying for each device whether transmission of management information is Allowed or Not Allowed; and when the communicator receives the identification information from the communication device, the controller reads the upload approval information corresponding to the received identification information from the storage device, and if the upload approval information that was read indicates that transmission of management information is Allowed, causes the communicator to send the address information corresponding to the received identification information to the communication device.

The invention can also be separately conceived of as a method corresponding to the steps executed by the communication device (or device) and the management server, a program causing hardware (a computer) to execute the method, and a computer-readable storage medium storing the program.

A system including a communication device (or device) and management server is another aspect of the invention.

For example, the invention may be embodied by a management system that manages a device, and includes: a communication device configured to acquire management information related to the device; and a management server configured to send address information specifying a server to manage the device to the communication device; the communication device, when the address information is received from the management server, sending management information related to the device to the server specified by the address information as the destination.

In a system according to another aspect of the invention, the server relationally manages a device and buyer information indicating a buyer of the device, and when replacement of a consumable is determined necessary based on management information related to the device transmitted from the communication device, transmits through the network a request to ship the consumable to the buyer.

Another aspect of the invention is a program (a device management program) configured to manage a device, and causing a computer to execute: a step of acquiring management information related to the device; a step of receiving from a management server address information specifying a server to manage the device; and a step of sending the management information to the server specified by the address information as the destination when the address information is received.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 2 schematically illustrates the configuration of an upload address definition table.

DESCRIPTION OF EMBODIMENTS

Preferred embodiments of the present invention are described below with reference to the accompanying figures. Note that the accompanying figures are for descriptive purposes only.

1. System Outline

Figure 1:
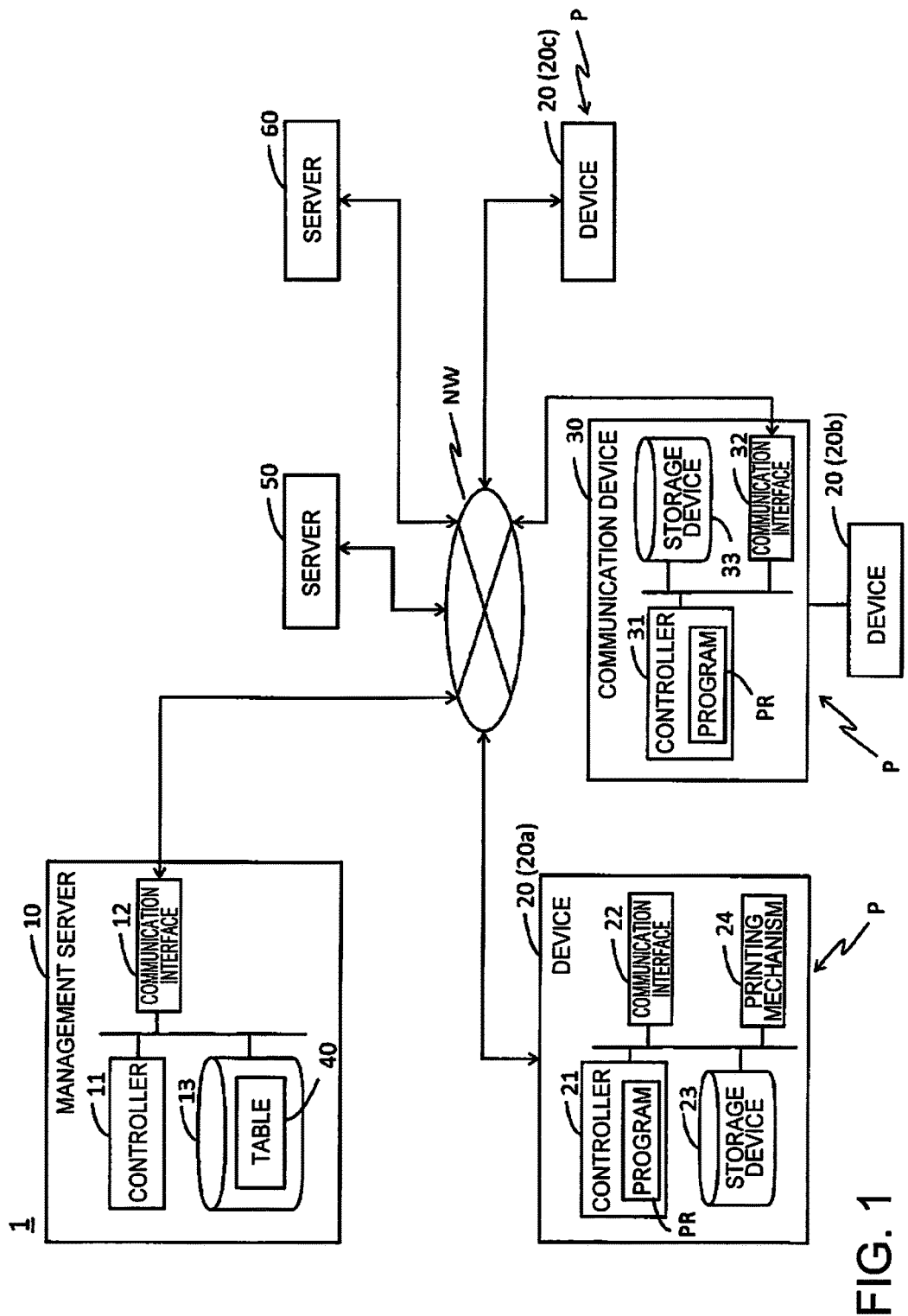
FIG. 1 schematically illustrates the configuration of a system.

FIG. 1 schematically illustrates the configuration of a system (device management system) according to this embodiment of the invention. The system 1 includes a management server 10, and one or more devices 20 (such as devices 20, 20b, 20c in this example). A device 20 in this embodiment of the invention may be any electronic device, such as a printer, a scanner, or a projector, whose state (status) may be managed by an external server. In one example below, the device 20 is a printer. A printer is a device configured with at least a printing capability. As a result, the printer may be a multifunction device also having the capabilities of a scanner or facsimile machine, for example.

The device 20 can connect to a network NW. The network NW includes, for example, the Internet and a local area network (LAN). The network NW may be a wired network or a wireless network.

The device 20 includes a controller 21, a communication interface 22, and a storage device 23. The internal configuration of device 20a is described below as representative of the multiple devices 20a, 20b, 20c.

The controller 21 includes one or more ICs such as a CPU, ROM, RAM, and other memory devices not shown. The controller 21 controls the behavior of the device 20 by the cooperation of an installed program (such as a device management program PR) and hardware.

The communication interface 22 is an interface configured to communicate with external devices through the network NW according to a specific communication protocol including a known communication standard.

The storage device 23 includes, for example, a hard disk drive, flash memory, or other storage device, and part of the controller 21.

While not shown in the figures, the device 20 has a suitable known configuration including, for example, a display unit for visually presenting information, and an operating unit such as a touch panel or physical buttons through which user operations are received. If the device 20 is a printer, the device 20 also includes a printing mechanism 24 (including, for example, a printhead for ejecting ink, an ink cartridge that holds ink, and a conveyance mechanism for conveying the print medium) configured to achieve the printing capability.

Such a device 20 (devices 20a, 20c) are capable of transmitting (uploading) management information (device management information) related to the device 20 through the network NW to an external server, and each device 20 is an example of a communication device that manages a device (manages itself) according to the invention.

Device management information is information used to manage a device 20 (printer), and in this example may include consumables information such as the remaining amount of ink in ink cartridges of the device 20 (printer), and the cumulative number of pages printed to date, error information about errors that may occur during the printing operation of the device 20, and other status information related to the device 20. The device management information is stored in the storage device 23 of the device 20.

The controller 21 appropriately updates the device management information already stored by the storage device 23 with newer device management information. The controller 21 then sends the device management information stored in the storage device 23 through the network NW to the external server.

In addition, as shown in the example in FIG. 1, the device 20 (device 20b) may also connect to another communication device 30 through a LAN or USB or other local connection, and connect to the network NW through the other communication device 30. This other communication device 30 may be embodied by, for example, a personal computer (PC), smartphone, tablet terminal, or mobile phone. The communication device 30 also includes a controller 31 (and a device management program PR installed on the controller 31), a communication interface 32, and a storage device 33. The basic configuration of the controller 31, interface 32, and storage device 33 may conform to the communication interface 22 and storage device 23 described above.

The communication device 30, by the controller 31 communicating wirelessly or by wire with a specific monitored device 20 (device 20b), acquires from the device 20b device management information about that device 20b, and stores the device management information to the storage device 33. The controller 31 then updates the device management information already stored in the storage device 33 based on the device management information acquired from the device 20b. The controller 31 can then upload the device management information of the device 20b stored in the storage device 33 through the network NW to an external server.

Therefore, the communication device 30 is another example of a communication device that manages a device according to the invention. Alternatively, a combination of a device 20b, and a communication device 30 that monitors and acquires device management information about the device 20b, may be treated as another example of a communication device.

Below, a device 20 (20a, 20c), the communication device 30, or a combination of the communication device 30 and a device 20 (20b), may also be referred to as simply a communication device P. The communication device P includes a storage device 23 (or storage device 33) that stores device management information related to a device 20; a communicator that handles communication with external devices through the network NW; and a controller 21 (or controller 31) that, when the communicator receives from a specific management server 10 address information (destination address information) specifying the server (the server to which the device management information is sent (uploaded)) that is to manage the device 20, causes the communicator to send the device management information to the server specified by the destination address information.

The management server 10 connects to the network NW. In the example in FIG. 1, server 50 and server 60 are also connected to the network NW. Each of the servers 10, 50, 60 may be embodied by one or a plurality of information processing devices that function on the network NW as a server. Alternatively each of the servers 10, 50, 60 may be a virtual server running on a physical server.

The management server 10 includes a controller 11, a communication interface 12, and a storage device 13.

The controller 11 includes one or more ICs such as a CPU, ROM, RAM, and other memory devices not shown, and through the cooperation of an installed program and hardware, controls the behavior of the management server 10.

The communication interface 12 is an interface configured to communicate with external devices through the network NW according to a specific communication protocol including a known communication standard. Therefore, the communication interface 12 and controller 11 embody the communicator of the management server 10.

The device management information uploaded to the management server 10 from a communication device P through the network NW is stored on the storage device 13. A table (upload address definition table) 40 is previously stored in the storage device 13.

2. Description of an Upload Address Definition Table

FIG. 2 shows a simple example of an upload address definition table 40.

The upload address definition table 40 is a table relationally storing identification information identifying individual devices 20, to destination address information specifying the server to which the device management information of that device 20 is sent. An example of identification information for each device 20 is the serial number of the particular device 20. Note that the identification information for each device 20 may be any information that uniquely identifies a single device 20, and may be, for example, the MAC address of the device 20. The identification information of a device 20 may also be identification information identifying the country or region where the device 20 is installed, such as the IP address the communication device P uses for communication.

The destination address information is information specifying at least one server included in the system 1 (such as server 10, 50, 60 in FIG. 1), and in this example supposes the URL (Uniform Resource Locator) of the server on the network NW. In addition to specifying the server, the URL may also obviously define where to store the information on the server (the directory).

When an IP address is used as the identification information as described above, the country or region where the communication device P (device 20 or communication device 30) is located can be determined from the IP address of the communication device P that is used for communication between the management server 10 and the communication device P, and the destination address information therefore specifies a server corresponding to the identified country or region.

In the example in FIG. 2, the upload address definition table 40 also stores upload approval information indicating whether or not uploading device management information for a particular device 20 is allowed. In other words, the upload address definition table 40 relationally stores, for each device 20, identification information, upload approval information, and upload destination address information. The upload approval information is previously selected by the user of the device 20, and set to either Allowed or Not Allowed.

A specific example of an application of this embodiment of the invention is described next.

The devices 20 are shipped to many regions and countries, and are used by many users in the many different regions and countries. The device management information for each device 20 is uploaded by the communication device P through the network NW to one of the servers 10, 50, 60. The server to which the device management information for a particular device 20 is uploaded can be managed by each device 20 based on the uploaded device management information of each device 20. Examples of management based on the device management information include providing such services as automatically ordering and automatically billing for the ink used by the device 20 (device 20 user) based on the remaining amount of ink and number of printed pages information; device 20 support processes based on error information; and other cloud services used over a network NW environment.

For example, suppose a management server 10 is located in Japan, another server 50 is located in the United States, and another server 60 is located in a country in Europe. From the perspective of being able to centrally and efficiently manage numerous devices 20, device management information for all devices 20 would ideally be uploaded to a single server (such as management server 10 in this example). In this scenario, device management information for all devices 20 sold around the world is uploaded through the network NW (Internet) and collected on the single management server 10.

On the other hand, from the perspective of business needs and variations in restrictions around the world (such as the laws applicable in specific countries or regions), uploading device management information for devices 20 in a specific region to a server located outside that particular region may not be appropriate (but uploading the device management information to a server located in that specific region is appropriate). For example, if the device management information is treated as a form of personal information, uploading the device management information to a server located in a country outside the country where the device 20 is located may be prohibited by law.

Considering such circumstances, this embodiment of the invention defines, in the upload address definition table 40 of the management server 10, the server to which device management information for a particular device 20 must be uploaded.

The user that purchased the device 20 can execute a pre-registration process for registering identification information and upload approval information related to the purchased device 20 in the management server 10. Various specific methods of implementing the pre-registration process are conceivable. For example, the user may execute the pre-registration process in the store where the device 20 was purchased. In this case, based on the intent of the user expressed by agreement in the pre-registration process, the store sends to the management server 10 by some communication means the identification information of the device 20 the user purchased, the upload approval information (information indicating whether the user selected Allowed or Not Allowed), and the name of the country or region where the user purchased the device 20 (purchase location information). Alternatively, the user, by operating an Internet communication terminal, sends the identification information of the purchased device 20, the upload approval information, and the purchase location information to the management server 10 through a specific web page provided for the pre-registration process.

On the management server 10 side, the controller 11 stores the combination of identification information and upload approval information for the device 20 that was transmitted in the pre-registration process described above in the upload address definition table 40. In addition, the controller 11 references the purchase location information that was transmitted with the identification information and upload approval information as described above, and stores the destination address information corresponding to the purchase location information relationally to the combination of identification information and upload approval information in the upload address definition table 40.

For example, suppose a case in which uploading device management information for devices 20 purchased in Japan and the United States is not particularly limited, but a rule is defined limiting uploading device management information to countries in Europe for devices 20 that were purchased in a country in Europe. Under this rule, the controller 11 stores in the upload address definition table 40 the URL of management server 10 (a server located in Japan) as the destination address information related to the identification information and upload approval information of devices 20 for which the purchase location information indicates Japan or the United States. However, controller 11 stores in the upload address definition table 40 the URL of management server 60 (a server located in Europe) as the destination address information related to the identification information and upload approval information of devices 20 for which the purchase location information indicates a country in Europe.

The device management information uploading process in this embodiment of the invention is described next based on a upload address definition table 40 being stored in the storage device 13 of the management server 10.

3. Embodiment 1

Figure 3:
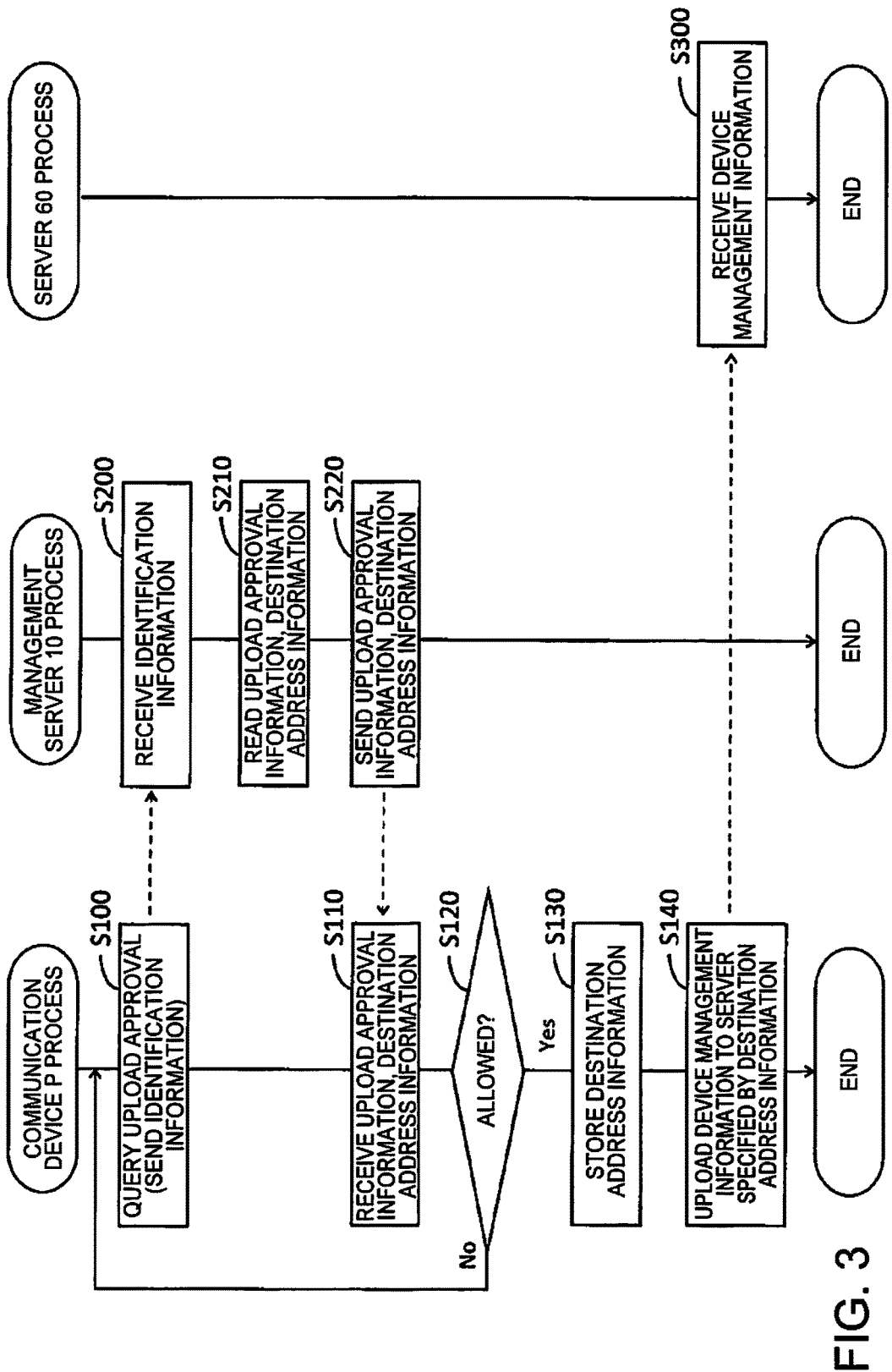
FIG. 3 is a flow chart illustrating the operation of a first embodiment of the invention.

FIG. 3 describes the parallel processes (flow charts) executed by the communication device P (controller 21 or controller 31), management server 10 (controller 11) and a server other than management server 10 (such as server 60 in this example). Communication described in FIG. 3 (and FIG. 4) is over the network NW. For convenience, the embodiment described with reference to FIG. 3 is referred to as the first embodiment.

The communication device P that primarily executes the uploading process queries whether or not uploading is allowed without knowing the server to upload to (the destination server) (step S100). In this case, the communication device P sends the identification information of the device 20 (itself) or other device 20 the communication device P is monitoring to the management server 10. Note that the communication device P may send a specific signal indicating querying whether or not uploading is allowed with the identification information of the device 20 to the management server 10.

When the management server 10 receives an upload approval query, that is, identification information of the device 20, from a communication device P (step S200), the management server 10 references the upload address definition table 40 stored in the storage device 13, and reads the upload approval information and destination address information relationally stored to the identification information received in step S200 (step S210). Next, the management server 10 sends the upload approval information and destination address information read in step S210 to the communication device P that sent the uploading approval query (identification information) (step S220). However, if the upload approval information read in step 210 was Allowed, the management server 10 may send to the communication device P upload approval information and destination address information indicating uploading is Allowed; and if the upload approval information read in step 210 was Not Allowed, the management server 10 may send to the communication device P upload approval information and destination address information indicating uploading is Not Allowed.

As the response to sending identification information in step S100, the communication device P then receives the upload approval information and destination address information from the management server 10 (step S110). At this time, if the received upload approval information is Not Allowed, only the upload approval information is received. If the upload approval information received from the management server 10 is Not Allowed (step S120: No), the communication device P repeats step S100. The time interval between when step S120 returns No and step S100 repeats is not specifically limited.

Note that the user of the device 20 may not execute the pre-registration process described above at the time the device 20 is purchased. In other words, the user decides whether or not to execute the pre-registration process, and if the pre-registration process is executed, when to execute the process. If the communication device P executes step S100, and sends identification information of a device 20 for which the pre-registration process has not been executed to the management server 10, the management server 10 that received the identification information in step S200 cannot read information corresponding to the identification information from the upload address definition table 40 in step S210. Therefore, when information corresponding to the identification information received in step S200 cannot be read from the upload address definition table 40, the management server 10 also sends upload approval information indicating Not Allowed to the communication device P in step S220.

If the upload approval information received in step S110 from the management server 10 is Allowed (step S120: Yes), the communication device P executes step S130 and step S140, and ends the process of the flow chart in FIG. 3. In step S130, the communication device P stores the destination address information received in step S110 to storage device 23 or storage device 33. Then in step S140, the communication device P uploads, to the server specified by the destination address information, the device management information that is currently stored in the storage device 23 or storage device 33 for the device 20 (itself) or a device 20 the communication device P is monitoring.

If the server designated by the destination address information the communication device P received in step S110 is server 60, for example, in step S140 the communication device P uploads the device management information for the device 20 to server 60. As a result, server 60 receives the device management information the communication device P uploaded to the server 60 in step S140 (step S300).

Note that if the upload approval information read in step S210 is Allowed, the management server 10 may omit sending upload approval information indicating Allowed to the communication device P, and may send only the destination address information to the communication device P (step S220). In this case, the communication device P receives from the management server 10 as the response to transmitting identification information in step S100 either destination address information or upload approval information indicating Not Allowed (step S110). If the communication device P received destination address information, the communication device P determines the upload approval information is Allowed (step S120: Yes), and executes step S130 and step S140.

After storing the destination address information to storage device 23 or storage device 33 in step S130, the communication device P regularly or irregularly identifies the destination of the device management information based on the stored destination address information, and uploads the device management information. In other words, the communication device P can, based on the destination address information once stored, repeatedly upload the device management information to the same upload destination (server 60 in the example in FIG. 3).

Such a storage device (storage device 23 or storage device 33) of the communication device P may also be considered a second storage device that receives destination address information received from the management server 10. The storage device (storage device 23 or storage device 33) of the communication device P is also a storage device (called a first storage device) that stores the device management information of the device 20 described above. The storage device (storage device 23 or storage device 33) of the communication device P may be configured as a first storage device and a second storage device embodied by a plurality of physically discrete storage devices, or as a first storage device and a second storage device occupying different storage areas in a common storage device.

In this embodiment of the invention, when destination address information specifying the server to which to send device management information is received from the management server 10, the communication device P uploads the device management information to the server specified by the destination address information as the destination. In other words, even if the appropriate upload destination for the device management information is not set to itself, the communication device P can upload the device management information to the appropriate server as the upload destination according to the destination address information received from the management server 10. Therefore, there is no need for a complicated operation such as individually setting the upload destination of the device management information on the communication device P side, and devices 20 (communication devices P) sharing the same specifications related to uploading device management information (a specification conforming to the destination address information acquired from a management server 10) can be sold worldwide.

A management server 10 according to this embodiment of the invention includes a storage device 13 storing the relationship (a upload address definition table 40) between the identification information of the device 20 and destination address information specifying the server to which to send device management information; a communicator (communication interface 12 and controller 11) that handles communicating through a network NW with an external communication device P that manages the device 20; and a controller 11 that causes the communicator to send destination address information corresponding to the identification information of the device 20 managed by the communication device P to the communication device P the communicator communicates with as the destination.

The communication device P then sends the identification information of the device 20 to the management server 10, and receives destination address information corresponding to that identification information from the management server 10 as the response to sending the identification information. Thus comprised, each communication device P, by a process of sending identification information of the device 20 to the management server 10, can acquire the correct upload destination for the device management information.

Furthermore, in this embodiment of the invention, the communication device P stores the destination address information received from the management server 10 in a second storage device (storage device 23 or storage device 33), and based on the destination address information stored in the second storage device, identifies the address to which to send the device management information. As a result, the communication device P, after storing the destination address information received from the management server 10 in the second storage device, can repeatedly upload the device management information to the correct upload destination by referencing the destination address information that was stored.

In addition, in this embodiment of the invention, the storage device 13 of the management server 10 stores upload approval information indicating whether uploading device management information for a particular device 20 is Allowed or Not Allowed. When identification information of the device 20 is received from a communication device P, the controller 11 reads the upload approval information corresponding to the identification information that was received from the storage device 13 (upload address definition table 40); and if the upload approval information that was read indicates that uploading the device management information is Allowed, sends the destination address information corresponding to the received identification information to the communication device P. Therefore, the communication device P acquires the upload destination for the device management information only if the user of the device 20 sets uploading device management information to Allowed, and is prohibited from uploading device management information contrary to the intent of the user.

4. Embodiment 2

A second embodiment of the invention presupposing the first embodiment described above is described next with reference to FIG. 4.

Figure 4:
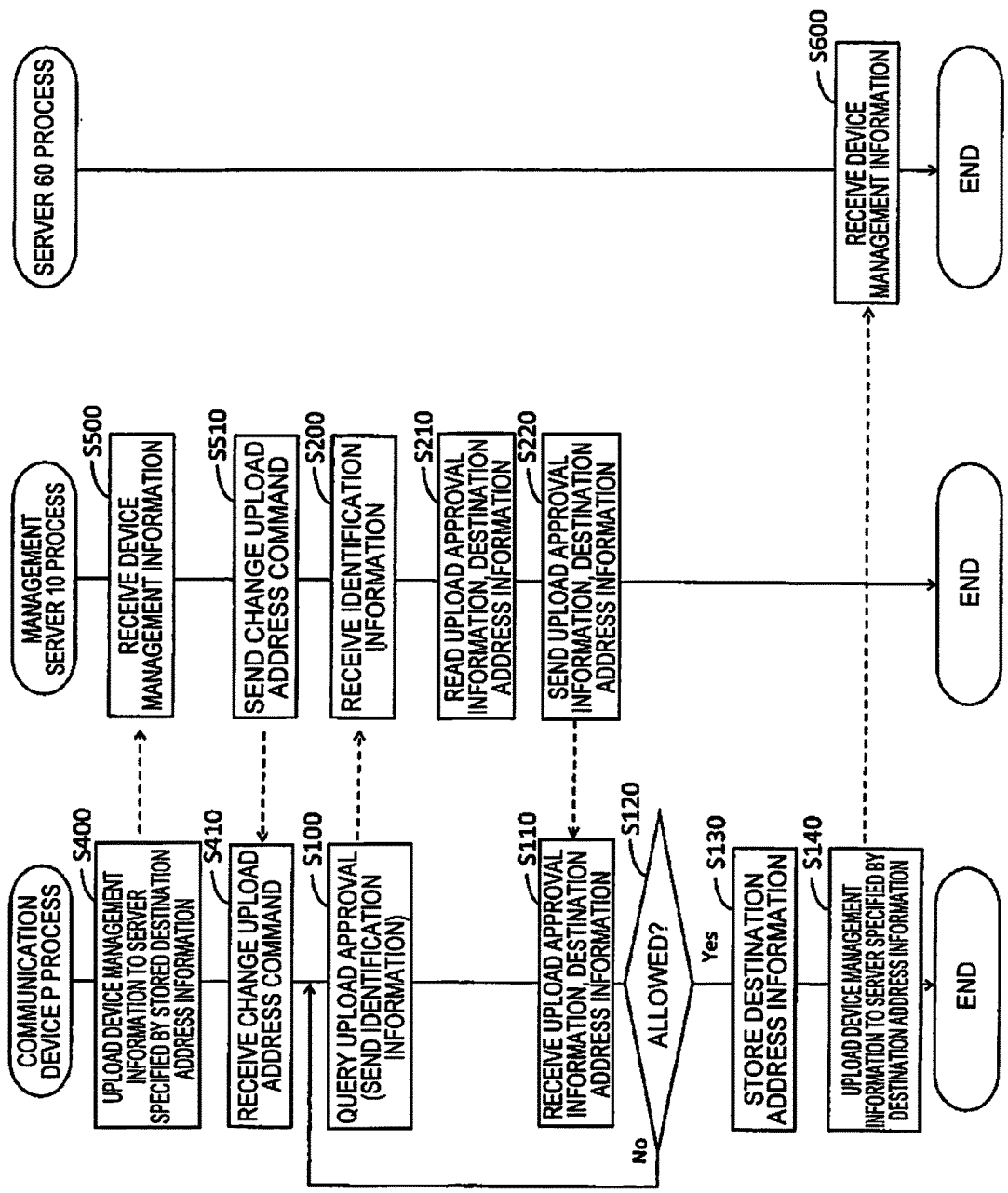
FIG. 4 is a flow chart illustrating the operation of a second embodiment of the invention.

FIG. 4 describes the parallel processes (flow charts) executed by the communication device P (controller 21 or controller 31), management server 10 (controller 11) and a server other than management server 10 (such as server 60).

The process of the communication device P shown in FIG. 4 is a process the communication device P executes after the process of the communication device P shown in FIG. 3. As described above, after storing the destination address information to the storage device 23 or storage device 33 in step S130 (FIG. 3) (and after step S140 in FIG. 3), the communication device P identifies the upload destination of the device management information based on the destination address information that was stored, and uploads the device management information (step S400).

Note that in the example in FIG. 3, the server specified by the destination address information the communication device P received in step S110 is server 60, but for convenience in the process shown in FIG. 4, the server specified by the destination address information the communication device P received in step S110 (FIG. 3) is assumed to be the management server 10. Therefore, in the example in FIG. 4, the communication device P, based on the stored destination address information, uploads the device management information of the device 20 to the management server 10. As a result, the management server 10 receives the device management information uploaded to the management server 10 from the communication device P (step S500).

The management server 10 that received device management information uploaded from the communication device P then sends a change upload address command to the communication device P that uploaded the device management information (step S510).

This second embodiment of the invention anticipates a case in which the destination (server) to which the communication device P repeatedly uploaded device management information based on the stored destination address information becomes inappropriate as an upload destination for some reason. An upload destination may become inappropriate for various reasons. In this embodiment there is no need to limit those reasons, but in one example, an upload destination that was previously appropriate for a particular communication device P may become inappropriate as an upload destination at some time due to a change in law, for example.

Step S510 is not always executed after step S500. However, FIG. 4 illustrates a case in which a server (management server 10 in this example) that was the upload destination for device management information from a particular communication device P determines that the upload destination of device management information from that communication device P must be changed from itself (management server 10 in this example) to another server, and returns a change upload address command for uploading device management information from that communication device P.

For example, suppose a server located in country A was receiving uploads of device management information from devices 20 located in country B, but due to a change in law, it becomes illegal for the server in country A to receive uploads of device management information for devices 20 located in country B. In this case, the server changes the upload settings to reflect the law, and in response to device management information being uploaded from a device 20 (communication device P) located in country B (step S400), returns a change upload address command (steps S500, S510).

Note that the server that received the uploads of device management information may, for example, determine the country or region from which the device management information was uploaded based on the IP address of the uploading device. The communication device P can also enable the server to which device management information was uploaded to determine the country or region from which the device management information was uploaded by uploading the purchase location information of the device 20 together with the device management information.

When the communication device P receives a change upload address command from the server at the upload destination (step S410), the communication device P executes the process from step S100 as shown in FIG. 4. In other words, prompted by the communication device P receiving a change upload address command, the process described in FIG. 3 (steps S100 to S140 of the communication device P, steps S200 to S220 of the management server 10) is executed again.

Note that when changing the upload destination of the device management information of a device 20 for some reason (such as a change in law), the management server 10 overwrites the destination address information relationally stored to the identification information of the device 20 in the upload address definition table 40 to the destination address information specifying the server of the new appropriate upload destination (the updated destination address information).

Therefore, in steps S210 and S220 in FIG. 4, the management server 10 reads and sends the updated destination address information from the upload address definition table 40 to the communication device P.

In step S130 in FIG. 4, the communication device P then overwrites the destination address information that was stored until then in the storage device 23 [sic, 22] or storage device 33 (in the example in FIG. 4, the destination address information specifying management server 10) with the updated destination address information received in step S110 (in this example, the destination address information specifying server 60). Next, in step S140 in FIG. 4, the communication device P uploads the device management information to the server (server 60) specified by the destination address information after being overwritten (that is, the updated destination address information).

As a result, the server 60 receives the device management information uploaded to itself from the communication device P in step S140 (step S600).

In this second embodiment of the invention, a server to which device management information was uploaded from a communication device P can return a change upload address command in response to device management information being uploaded from the communication device P.

When the communication device P receives a change upload address command from the server specified by the destination address information, the communication device P sends identification information of the device 20 to the management server 10, receives from the management server 10, in response to sending the identification information, new destination address information (updated destination address information) corresponding to the identification information, and uploads the destination address information to the server specified by the new destination address information as the destination.

As a result, when the upload destination of the device management information is changed for some reason (such as a change in law), the communication device P can reliably respond to the change. In the example in FIG. 4, the upload destination of the device management information uploaded by the communication device P before the change is the management server 10, and the upload destination after the change is the server 60, but cases in which the upload destination before the change is the server 60 and the upload destination after the change is the management server 10, and other combinations of servers as the upload destination before and after the change are obviously conceivable.

5. Embodiment 3

In FIG. 3, the communication device P may purposely not store the destination address information received in step S110 in memory (not execute step S130), and after executing step S140 may return to step S100 (embodiment 3).

In other words, the communication device P may query the management server 10 each time in order to upload the device management information (step S100) to acquire the destination address information, and upload the device management information to the server specified by the acquired destination address information. Because the communication device P always checks the upload destination with the management server 10 whenever uploading device management information, the communication device P can reliably upload the device management information to the optimum upload destination every time even without receiving a change upload address command from the server of the upload destination.

6. Embodiment 4

A specific example of an automated consumables ordering process executed by a server (management server 10, 50, 60) that received device management information for a device 20 uploaded from a communication device P is described next.

The server relationally manages devices 20 and buyer information indicating the buyer (sales channel) of the devices 20. A sales channel indicates a single organization that purchases devices 20 or device 20 consumables, or a group of one or more related organizations.

For example, a first home appliance seller, and a second home appliance seller that is capitalized independently of the first home appliance seller, and different sales channels. In another example, a first Internet shopping site and a second Internet shopping site that is capitalized independently of the first Internet shopping site, are also different sales channels. Users can purchase devices 20 from the desired sales channel selected from among the many sales channels available around the world.

For example, during the pre-registration process described above, buyer information indicating the sales channel through which the user purchased a device 20 is sent together with other information, such as the identification information of the device 20, to the management server 10. The management server 10, together with the other servers 50, 60, relationally stores identification information of the device 20 and buyer information (a data table).

When uploading the device management information for a device 20 to a server according to the destination address information, the communication device P also uploads the identification information of the device 20.

In this environment, a server that received an upload of device management information from a communication device P, determines whether or not particular consumables, such as ink cartridges, ink tanks, ink packs or other consumables installed in the printer if the device 20 is an inkjet printer, should be replaced based on consumables information included in the device management information (such as if the remaining amount of ink is less than or equal to a threshold, for example). Note that if the device 20 is a projector, the server determines if consumables such as lamps installed in the projector should be replaced (for example, if the remaining service life of the lamp is less than or equal to a threshold).

If the server determines a consumable should be replaced, the server references the relationship between the buyer information and the identification information of the device 20 that is managed (can be referenced or is stored), and identifies the buyer information related to the identification information uploaded with the device management information. Then, based on the identified buyer information, the server sends through the network NW to the sales channel indicated by the buyer information a request to ship the consumable to the user. As a result, an automated consumables ordering process is thus executed by the server (management server 10, 50, 60) that received the device management information of the device 20 uploaded from the communication device P. This automated consumables ordering process is also beneficial to the sales channel because it assures opportunities for the sales channel from which the user purchased the device 20 to sell (deliver) consumables to the user.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

The entire disclosure of Japanese Patent Application No. 2017-86968, filed Apr. 26, 2017 is expressly incorporated by reference herein.

What is claimed is:

1. A communication device that manages a device, comprising:
   a storage device configured to store management information related to the device;
   a communicating circuit configured to send identification information of the device to a management server and to receive address information specifying a server to manage the device from the management server through a network after the management server has identified the address information corresponding to the identification information based on relational information relationally storing the identification information of the device and the address information specifying the server to manage the device; and a processor configured to cause the communicating circuit to send the management information to the server specified by the address information as a transmission destination.

2. The communication device described in claim 1, wherein:
the processor causes the communicating circuit to send identification information of the device to the management server; and
the communicating circuit receives the address information corresponding to the identification information from the management server as a response to transmission of the identification information.

3. The communication device described in claim 1, wherein:
the processor stores the address information the communicating circuit received in a second storage device, and determines a destination of the management information based on the address information the second storage device stores.

4. The communication device described in claim 1, wherein:
when the communicating circuit received a command to change the destination of the management information from the server specified by the address information,
the processor causes the communicating circuit to send the identification information of the device to the management server; and
when the communicating circuit receives new address information corresponding to the identification information from the management server as a response to transmission of the identification information,
the processor causes the communicating circuit to send the management information to the server specified by the new address information as a destination.

5. The communication device described in claim 1, wherein:
the communication device acquires the management information from an external device, and stores the acquired management information in the storage device.

6. The communication device described in claim 1, wherein:
the communication device includes the device.

7. The communication device described in claim 1, wherein:
the device is a printer having a consumable installed and using the consumable to print; and
the management information includes information indicating a state of the consumable.

8. A management server comprising:
a storage device configured to store relational information relationally storing identification information of a device and address information specifying a destination server to which management information related to a device is sent;
a communicating circuit configured to execute communication through a network with an external communication device that manages a device, the communicating circuit receiving the identification information of the device from the communication device and identifying the address information corresponding to the identification information of the device based on the relational information; and
a processor configured to cause the communicating circuit to send the address information corresponding to the identification information of the device to the communication device as a destination.

9. The management server described in claim 8, wherein:
the storage device additionally stores upload approval information specifying for each device whether transmission of the management information is Allowed or Not Allowed; and
when the communicating circuit receives the identification information from the communication device, the processor reads the upload approval information corresponding to the received identification information from the storage device, and if the upload approval information that was read indicates that transmission of the management information is Allowed, causes the communicating circuit to send the address information corresponding to the received identification information to the communication device.

10. A management system that manages a device, comprising:
a communication device configured to acquire management information related to the device; and
a management server configured to store relational information relationally storing identification information of the device and address information specifying a server to manage the device, the management server receiving the identification information of the device from the communication device, identifying the address information corresponding to the identification information of the device based on the relational information, and sending the address information to the communication device, wherein
the communication device receives the address information from the management server and sends the management information to the server specified by the address information as a destination.

11. The management system described in claim 10, wherein:
the server relationally manages the device and sales channel information indicating a sales channel where a user purchase the device, and when replacement of a consumable is determined necessary based on the management information related to the device transmitted from the communication device, transmits through the network a request to ship the consumable to the sales channel.

12. A non-transitory computer-readable recording medium storing a program configured to manage a device, and causing a computer to execute:
a step of acquiring management information related to the device;
a step of sending identification information of the device to a management server;
a step of receiving address information specifying a server to manage the device from the management server after the management server has identified the address information corresponding to the identification information of the device based on relational information relationally storing the identification information of the device and the address information specifying the server to manage the device; and
a step of sending the management information to the server specified by the address information as a destination.

* * * * *